United States Patent
Lally et al.

(10) Patent No.: US 11,492,012 B2
(45) Date of Patent: Nov. 8, 2022

(54) METHOD FOR AUTONOMOUSLY PARKING A CURRENT VEHICLE ALONG A TRAINED TRAJECTORY

(71) Applicant: Connaught Electronics Ltd., Tuam (IE)

(72) Inventors: Deardriu Lally, Tuam (IE); Olivia Donnellan, Tuam (IE)

(73) Assignee: Connaught Electronics Ltd., Tuam (IE)

(*) Notice: Subject to any disclaimer, the term of this patent is extended or adjusted under 35 U.S.C. 154(b) by 46 days.

(21) Appl. No.: 16/644,688

(22) PCT Filed: Aug. 28, 2018

(86) PCT No.: PCT/EP2018/073078
§ 371 (c)(1),
(2) Date: Mar. 5, 2020

(87) PCT Pub. No.: WO2019/048287
PCT Pub. Date: Mar. 14, 2019

(65) Prior Publication Data
US 2020/0283023 A1    Sep. 10, 2020

(30) Foreign Application Priority Data
Sep. 8, 2017  (DE) .................. 10 2017 120 778.3

(51) Int. Cl.
*B60W 60/00* (2020.01)
*B60W 30/06* (2006.01)
(Continued)

(52) U.S. Cl.
CPC ........ *B60W 60/0025* (2020.02); *B60W 30/06* (2013.01); *G07C 5/02* (2013.01); *B60W 2556/45* (2020.02)

(58) Field of Classification Search
CPC ............. B60W 60/0025; B60W 30/06; B60W 2556/45; G07C 5/02; G05D 2201/0213; B62D 15/0285
See application file for complete search history.

(56) References Cited

U.S. PATENT DOCUMENTS 10,384,647 B2    8/2019  Tayama
2013/0085637 A1*  4/2013  Grimm ................. G05D 1/00
                                            701/25
(Continued)

FOREIGN PATENT DOCUMENTS

DE    102010023162 A1    12/2011
DE    102011084124 A1     4/2013
(Continued)

OTHER PUBLICATIONS

The Notification of Reason for Rejection issued in corresponding Japanese Application No. 2020-513813, dated Mar. 23, 2021 (9 pages).
(Continued)

*Primary Examiner* — Frederick M Brushaber
(74) *Attorney, Agent, or Firm* — Osha Bergman Watanabe & Burton LLP

(57) ABSTRACT

The present invention refers to a method for autonomously parking a current vehicle (40) along a trained trajectory (18), comprising the steps of driving a training vehicle (12) along the trajectory (18) and determining environment information along the trajectory (18), determining trajectory information based on the environment information for parking the current vehicle (40) along the trajectory (18), storing the trajectory information from the training vehicle (12) in a personal storage (34) associated to a driver, transferring the trajectory information from the personal storage (34) to the
(Continued)

Figure 1:
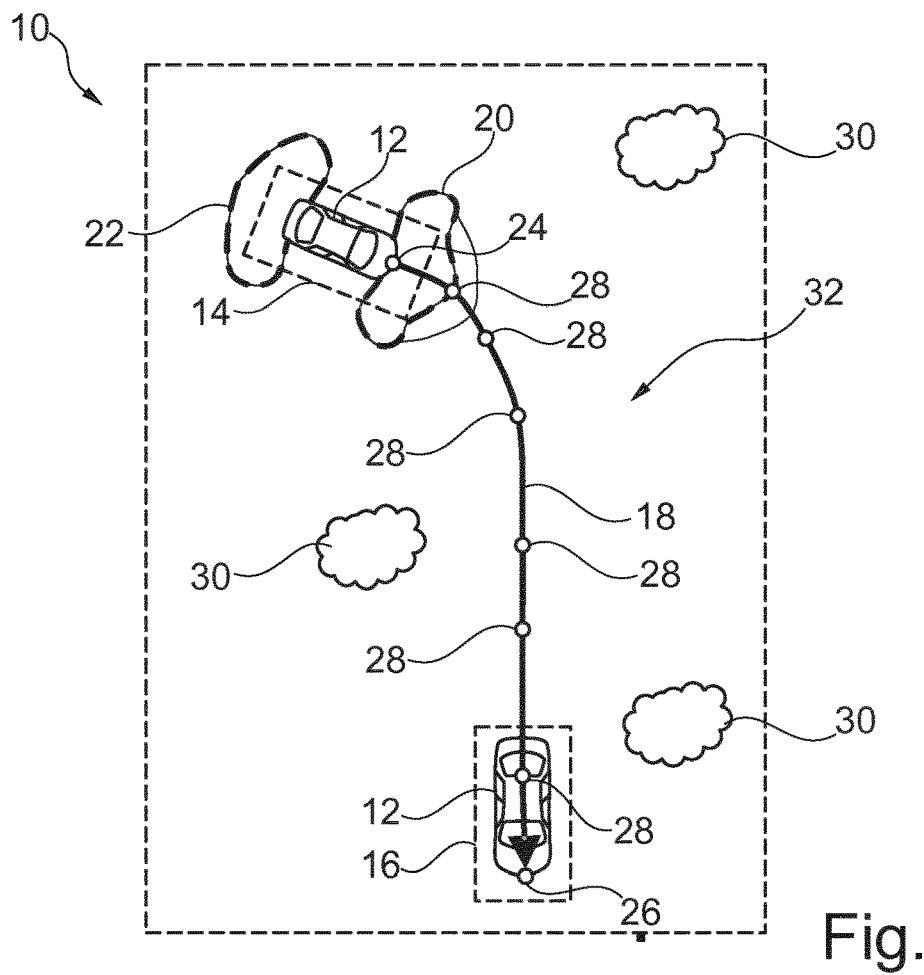

current vehicle (40), and parking the current vehicle (40) along the trained trajectory (18).

12 Claims, 2 Drawing Sheets

(51) Int. Cl.
*G07C 5/02* (2006.01)
*B62D 15/02* (2006.01)

(56) References Cited

U.S. PATENT DOCUMENTS

| | | | |
|---|---|---|---|
| 2013/0151035 A1 | 6/2013 | Park et al. | |
| 2013/0166106 A1* | 6/2013 | Nakagawa | G06F 17/00 701/2 |
| 2013/0231824 A1* | 9/2013 | Wilson | G01C 21/3415 701/26 |
| 2014/0358417 A1* | 12/2014 | Lavoie | G01C 21/165 701/300 |
| 2014/0358424 A1* | 12/2014 | Lavoie | B60W 30/06 701/428 |
| 2014/0358429 A1* | 12/2014 | Shutko | B60W 50/14 701/458 |
| 2016/0284217 A1* | 9/2016 | Lee | B60D 1/30 |
| 2017/0192436 A1* | 7/2017 | Min | G01C 21/32 |
| 2017/0334380 A1* | 11/2017 | Bonnet | B60Q 1/02 |
| 2018/0272991 A1 | 9/2018 | Tayama | |
| 2019/0232952 A1* | 8/2019 | Kim | G08G 1/143 |
| 2020/0209845 A1* | 7/2020 | Chen | G05D 1/0038 |
| 2020/0209846 A1* | 7/2020 | Chen | B60W 30/18163 |
| 2021/0129832 A1* | 5/2021 | Sakano | G08G 1/0962 |

FOREIGN PATENT DOCUMENTS

| | | |
|---|---|---|
| DE | 102013015349 A1 | 4/2014 |
| DE | 102014018187 A1 | 6/2015 |
| DE | 102014018189 A1 | 6/2016 |
| DE | 102016216157 A1 | 3/2018 |
| DE | 102016217330 A1 | 3/2018 |
| JP | 2013-133091 A | 7/2013 |
| JP | 2013-530867 A | 8/2013 |
| JP | 2017-043267 A | 3/2017 |
| KR | 2013-0065104 A | 6/2013 |

OTHER PUBLICATIONS

The Notice of Preliminary Rejection issued in corresponding Korean Application No. 2020-7006503, dated Apr. 16, 2021 (11 pages).
International Search Report issued in corresponding International Patent Application No. PCT/EP2018/073078, dated Jan. 7, 2019 (3 pages).
Written Opinion issued in corresponding International Patent Application No. PCT/EP2018/073078, dated Jan. 7, 2019 (6 pages).
German Search Report issued in corresponding German Application No. 10 2017 120 778 3, dated Jun. 7, 2018 (7 pages).

* cited by examiner

METHOD FOR AUTONOMOUSLY PARKING A CURRENT VEHICLE ALONG A TRAINED TRAJECTORY

The present invention refers to a method for autonomously parking a current vehicle along a trained trajectory, comprising the steps of driving a training vehicle along the trajectory and determining environment information along the trajectory, and determining trajectory information based on the environment information for parking the current vehicle along the trajectory.

Automated parking systems are already available in the market. A new category of such automated parking systems comprises semi-autonomous or trained parking systems. In these semi-autonomous parking systems, the driver of the vehicle must train the vehicle for a particular trajectory that they wish the vehicle to subsequently follow to park. In order perform the semi-autonomous parking, the vehicles needs to be aware of the geometry of the environment. Hence, semi-autonomous parking systems use various environment sensors to record information from the environment, also referred to as landmarks, corresponding to a trajectory driven for training purposes. Such environment sensors can comprises one or multiple of different classes of environment sensors including ultrasonic sensors, lidar-based sensors, radar-based sensors, cameras, or others to monitor the environment.

Based on such a trained trajectory, modern semi-autonomous vehicles can park themselves in the trained location. Hence, after training the trajectory, the vehicle performs a parking maneuver along the trained trajectory. In such a case, the vehicle uses its environment sensors, e.g. the above-mentioned ultrasonic sensors, lidar-based sensors, radar-based sensors, cameras, or others and compares newly sensed environment information to the previously stored trajectory information to work out its position relative to the stored trajectory, which is then used to make decisions on how to maneuver the vehicle until it eventually parks at the stored park slot location. Accordingly, the environment sensors are first used to detect its way to the parking location in accordance with the trajectory. Second, the vehicle uses the environment sensors in order to keep track on obstacles added to the environment compared to a time the trajectory was determined and to identify moving objects. Accordingly, during a subsequent "replay", potentially dangerous driving situations can be avoided when parking the vehicle.

Such a trained trajectory and a trained location typically refer to premises, which are repeatedly visited for parking the vehicle, i.e. an area, where the driver lives or works. In general, such zones a referred to as home zone in the context of this application.

One drawback with these existing solutions is that the trained information, i.e. the stored trajectory, is associated with and stored in a storage of the training vehicle. This is fine for the case a driver typically uses the same vehicle. In cases where a driver frequently changes his vehicle and e.g. uses a different vehicle for each journey, this does not work, since the trained trajectory will most probably not be available in the currently used vehicle. Hence, there is little benefit in training each vehicle, since the driver probably will not use the same vehicle for the same home zone again or at least not in very rare cases. Such cases can occur e.g. when the driver uses a car sharing service, hires a rental vehicle, or is user of a shared fleet of vehicles, e.g. in case of business vehicles. The same applies if multiple drivers use a single vehicle.

Furthermore, training trajectories for parking a vehicle requires a huge amount of storage volume. Hence, in the above cases, it would require a vast amount of memory storage to accommodate for multiple users multiple trajectories in multiple home zones. This increases the cost of the system, impacts on runtime, as multiple trajectories may need to be processed, and also restricts the usability of the function.

In this respect, document DE 10 2011 084 124 A1 relates to a calculation unit, a computer program product and a method for navigating a vehicle to a parking place, said vehicle collecting information relating to the vehicle surroundings by means of sensors. Said vehicle obtains information relating to the parking place from an external data source. The information from the external data source is obtained using sensors on other vehicles and transmits it to the external data sources. The vehicle takes into account the information from the individual sensors and the information from the external data sources during the navigation to the parking place.

It is an object of the present invention to provide a method for autonomously parking a current vehicle along a trained trajectory, which enables simple and efficient use of trained trajectories in different vehicles.

This object is achieved by the independent claims. Advantageous embodiments are given in the dependent claims.

In particular, the present invention provides a method for autonomously parking a current vehicle along a trained trajectory, comprising the steps of driving a training vehicle along the trajectory and determining environment information along the trajectory, determining trajectory information based on the environment information for parking the current vehicle along the trajectory, storing the trajectory information from the training vehicle in a personal storage associated to a driver, transferring the trajectory information from the personal storage to the current vehicle, and parking the current vehicle along the trained trajectory.

The basic idea of the invention is to teach a trajectory depending on a driver of the vehicle. Accordingly, different locations for parking the current vehicle can be considered in an efficient way. Furthermore, by assigning the trajectory information to a driver, the trajectory information can be kept as personal information, which is not accessible to third parties. A trajectory has to be trained only once by the driver, independent from the vehicle he uses, when parking the vehicle according to the previously trained trajectory is required. Accordingly, the training vehicle can be any kind of vehicle. Of course, the current vehicle can also be the training vehicle. The distinction between the training vehicle and the current vehicle is merely made in order to distinguish between determining the trajectory information and using the trajectory information to park the respective vehicle.

Accordingly, the trajectory information can be obtained e.g. using a differently sized training vehicle and/or a training vehicle having different kinds of environment sensors for determining the environment information and the trajectory information. It is merely required to provide the trajectory information in a way, which is independent from any training vehicle or current vehicle.

Determining environment information along the trajectory can comprise using different environment sensors to record information from the environment, also referred to as landmarks, corresponding to the trained trajectory. Such environment sensors can comprises one or multiple of different classes of environment sensors including ultrasonic sensors, lidar-based sensors, radar-based sensors, cameras, or others to monitor the environment. The sensor information can then be processed to determine the trajectory information out of the environment information in any suitable format.

Parking the current vehicle along the trained trajectory is done semi-autonomously by the current vehicle. Hence, the current vehicle performs a parking maneuver along the trained trajectory. The vehicle uses its environment sensors, e.g. any of the above-mentioned ultrasonic sensors, lidar-based sensors, radar-based sensors, cameras, or others and compares sensed environment information to the previously stored trajectory information to work out its position relative to the stored trajectory, which is then used to make decisions on how to maneuver the vehicle until it eventually parks at its stored park slot location. Hence, the environment sensors are first used to detect a way to the parking location in accordance with the trajectory information, and second, the current vehicle uses the environment sensors in order to keep track on obstacles added to the environment compared to a time the trajectory was trained and to identify moving objects.

In this context, it is to be noted that the driver can be a single, individual person, or a group of persons, which e.g. share a home zone for parking the vehicle.

According to a modified embodiment of the invention, the method comprises a step of providing the personal storage in an access device for accessing the vehicle, the step of storing the trajectory information from the training vehicle in a personal storage associated to a driver comprises storing the trajectory information in the access device, and the step of transferring the trajectory information from the personal storage to the current vehicle comprises transferring the trajectory information from the access device to the current vehicle. The access device can be any kind of "key", which is used for accessing the vehicle, and which is typically required for driving the vehicle. The "key" can be any kind of conventional mechanic or electromechanic key, which comprises e.g. in a housing a memory as personal storage. However, also other types of keys can be used, e.g. keys which electronically grant access to the vehicle. Hence, it is not important, if the key has a physical connection or e.g. wireless connection with the vehicle. It is merely important, that the "key" is typically present when driving the vehicle, and that there is a possibility to access the memory of the "key". The "key" has the advantage, that it is typically carried with the driver. In particular, when each driver has its own key, this can already be beneficial to provide individual storage for storing the trajectory information of the trained trajectory. However, electronic key devices can contain e.g. an identification of the driver, and can be used for accessing multiple vehicles, e.g. the vehicles of a fleet.

According to a modified embodiment of the invention, the method comprises an additional step of providing the personal storage in a mobile device of a driver, the step of storing the trajectory information from the training vehicle in a personal storage associated to a driver comprises storing the trajectory information in the mobile device, and the step of transferring the trajectory information from the personal storage to the current vehicle comprises transferring the trajectory information from the mobile device to the current vehicle. Hence, the trained trajectory is stored in a device, which is typically taken with the driver, so that the trajectory can be easily provided when using a particular current vehicle. Typical mobile device can readily be used in such applications, since they can be connected to nowadays vehicles and have incorporated a memory for storing the trajectory information.

According to a modified embodiment of the invention, the method comprises an additional step of providing the personal storage in a network storage service associated to the driver, the step of storing the trajectory information from the training vehicle in a personal storage associated to a driver comprises storing the trajectory information in the network storage service, and the step of transferring the trajectory information from the personal storage to the current vehicle comprises transferring the trajectory information from the network storage service to the current vehicle. The network storage device can be accessed either directly from the vehicle, or via a mobile device of the driver. The network storage has the advantage, that it typically enables to store huge amounts of data, and that the stored data can be accessed independently from a particular access device. With the driver having his personal storage provided in the network storage service, it is still guaranteed that only the driver has access to the trajectory information from the trajectories he trained.

According to a modified embodiment of the invention, each of the steps of storing the trajectory information from the training vehicle in a personal storage associated to a driver and the step of transferring the trajectory information from the personal storage to the current vehicle comprises providing access information for accessing the personal storage. The access information protects the personal storage from being access by third parties. Even in the case when the personal storage is physically under control of the driver, e.g. when the personal storage is provided in the access device or the mobile device of the driver, the access information adds an additional level of protection to prevent third parties from accessing the personal storage. This can be important e.g. in case the personal storage is physically lost, of when a third party obtains unauthorized access e.g. to the mobile device.

According to a modified embodiment of the invention, each of the steps of storing the trajectory information from the training vehicle in a personal storage associated to a driver and the step of transferring the trajectory information from the personal storage to the current vehicle comprises an additional step of establishing a wireless data connection from the training vehicle or the current vehicle, respectively, to the personal storage. The wireless data connection can be any kind of suitable connection, including short range and long range communication standards. The kind of wireless data connection can comprise a direct connection to the personal storage, or a connection via a different device. E.g. the vehicle can have a mobile data connection to access a telecommunication network, e.g. according to 3G or 4G communication standards, so that the vehicle can communicate directly to the personal storage, e.g. in case of a network storage service. Alternatively, the vehicle can use e short range communication standard like WIFI, Bluetooth, or others, in order to communicate e.g. directly with a mobile device or an access device of the driver, or to communicate via the mobile device of the driver e.g. with the network storage service.

According to a modified embodiment of the invention, the method comprises additional steps of providing a storage unit in the current vehicle and storing the trajectory information transferred from the personal storage in the storage unit of the current vehicle. Hence, e.g. the most recent trajectory information can be copied to and kept in the current vehicle, so that it is not required, that the personal storage is permanently available. This increases comfort for the driver in case the current vehicle is repeatedly used.

According to a modified embodiment of the invention, the method comprises an additional step of deleting the storage unit prior to or during transfer of the trajectory information from the personal storage to the current vehicle. Accordingly, previous trajectory information is automatically erased, when a driver uses a current vehicle for the first time after use of the current vehicle by another driver. This keeps the trajectory information personal to the driver without a different driver having access to trajectory information previously used in the current vehicle.

According to a modified embodiment of the invention, the steps of transferring the trajectory information from the personal storage to the current vehicle, and parking the current vehicle along the trained trajectory are performed in parallel. Hence, the trajectory information is not only made available directly from the personal storage, it is even directly accessed by the vehicle from the personal storage, so that no local copy is required. Accordingly, the parking the current vehicle along the trained trajectory, whereby the trajectory information is accessed as required from the personal storage.

According to a modified embodiment of the invention, the method comprises additional steps of storing user settings of the training vehicle in the personal storage, and transferring the user settings from the personal storage to the current vehicle. The same principles as discussed above also apply to other kinds of user settings made to the vehicle. It can increase a comfort of using the vehicle, when personal settings of the vehicle can be automatically adapted to a current driver. Such personal settings can comprise seat adjustment information, driving preferences, driving directions for navigation, preferred radio or multimedia settings, phonebook information for a hands-free telephone system, just to name a few. Some of this information is highly personal, so that apart from having this information available every time in a used vehicle, it is beneficial to keep this information private an to not make it available to all users of the vehicle. Hence, it is preferred that this information is automatically removed from the current vehicle, when the driver leaves the vehicle.

According to a modified embodiment of the invention, the step of transferring the trajectory information from the personal storage to the current vehicle comprises selecting one out of multiple trajectories stored in the personal storage, and transferring the trajectory information of the selected trajectory to the current vehicle. Hence, in case trajectory information for different trained trajectories is available, the most relevant trajectory information can be selected. I.e., even when the driver temporarily changes e.g. to a holiday location, the correct trajectory can be selected and applied to facilitate parking also in this location after just a single training of the trajectory in advance to the selection.

According to a modified embodiment of the invention, the step of storing the trajectory information from the training vehicle in a personal storage associated to a driver comprises storing a location of the trajectory in the personal storage, and the step of selecting one out of multiple trajectories stored in the personal storage comprises selecting the trajectory based on current location information. Hence, in case trajectory information for different trained trajectories is available, the most relevant trajectory information can be automatically identified based on the location information stored with the trajectory information compared to a current location of the vehicle. I.e., even when the driver temporarily changes e.g. to a holiday location, the correct trajectory can be automatically selected and applied to facilitate parking also in this location after just a single training of the trajectory.

These and other aspects of the invention will be apparent from and elucidated with reference to the embodiments described hereinafter. Individual features disclosed in the embodiments con constitute alone or in combination an aspect of the present invention. Features of the different embodiments can be carried over from one embodiment to another embodiment.

Figure 2:
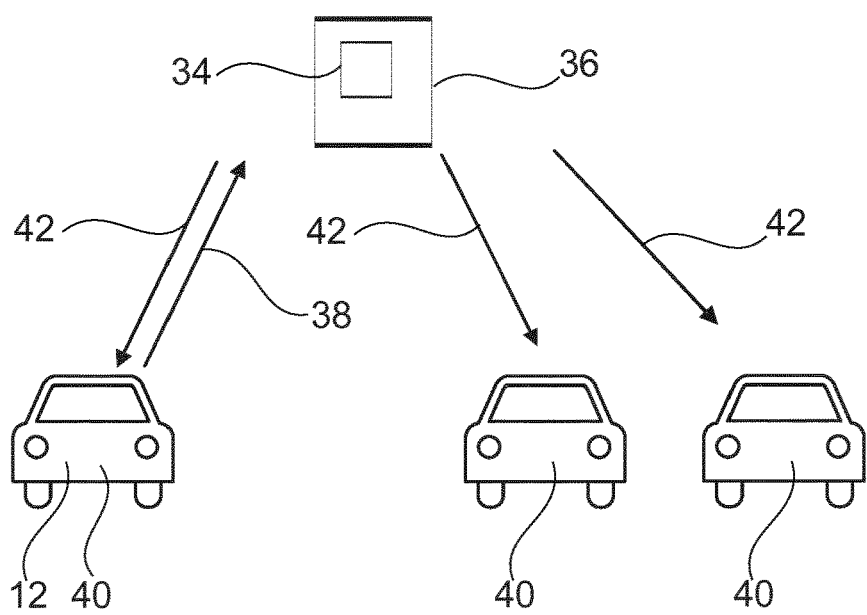
Figure 3:
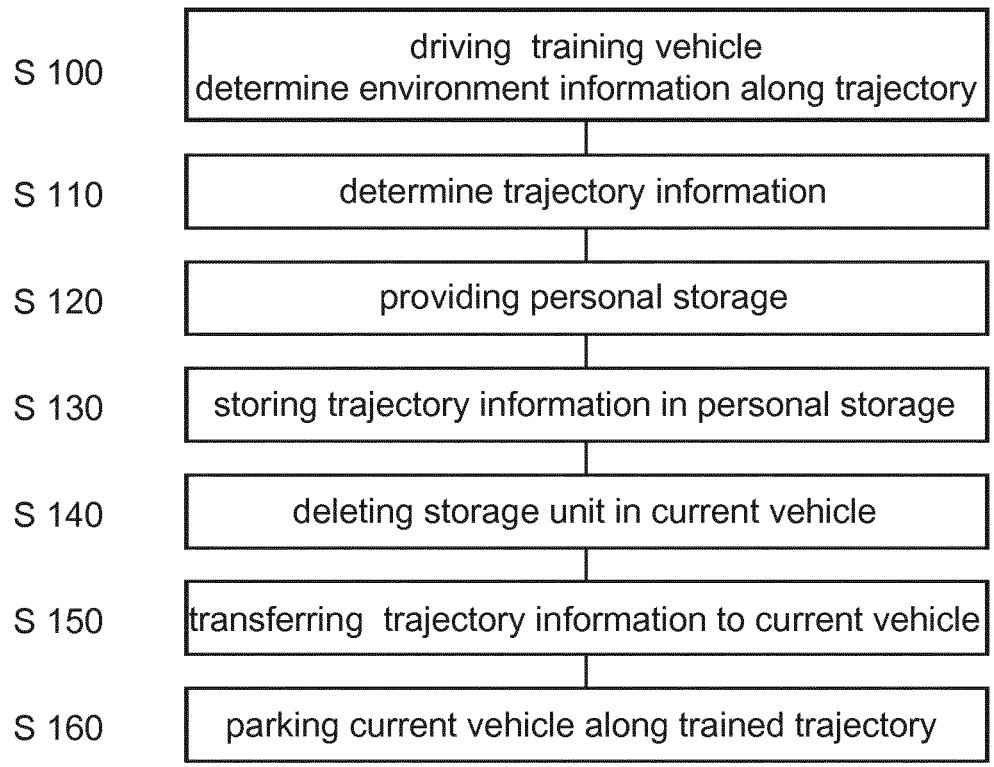

In the drawings:

FIG. 1 shows a schematic view a training scene with a training vehicle according to a first, preferred embodiment of the present invention, FIG. 2 shows a schematic representation of a training vehicle and current vehicles in communication with a personal storage provided in a mobile device of a driver in accordance with the first embodiment, and FIG. 3 shows a flowchart of a method for autonomously parking a current vehicle along a trained trajectory according to the first embodiment.

FIG. 1 shows a schematic representation of a training scene 10 with a training vehicle 12 in accordance with a first, preferred embodiment. The training vehicle 12 is any kind of vehicle, which is generally driven by a driver. The training vehicle 12 is shown at a starting position 14 and at an end position 16 of a trajectory 18 for parking the training vehicle 12.

The training vehicle 12 comprises a driver assistance device with at least two environment sensors. The driver assistance device and the environment sensors are not explicitly shown in the figures. The environment sensors used in this embodiment are by way of example cameras located at a front area and a rear area of the training vehicle 12. Detection regions 20, 22 of these environment sensors correspond to a front detection region 20 at the front area of the training vehicle 12 and a rear detection region 22 at the rear area of the training vehicle 12.

Subsequently, a method for autonomously parking a current vehicle 40 along a trained trajectory 18 according to the first embodiment will be discussed in detail with respect to FIG. 3. The method is partially performed in the training scene 10 as described with respect to the first embodiment.

The method starts in step S100 with driving the training vehicle 12 along the trajectory 18 and determining environment information along the trajectory 18.

Hence, the training vehicle 12 is driven by a driver along a path given by the trajectory 18 from a reference starting point 24 in the to a reference end point 26 of said trajectory 18. The trajectory 18 comprises a curved section followed by a straight section and is sufficiently described by a plurality of intermediate reference points 28 together with the reference starting point 24 and the reference end point 26. Different environment objects 30 are located in a surrounding area 32 of the trajectory 18. The environment objects 30 of the example shown in FIG. 1 are trees, which form landmarks along the trajectory 18.

While driving the training vehicle 12 along the trajectory 18 from the reference starting point 24 to the reference end point 26, environment information along the trajectory 18 is determined by means of the driver assistance device.

In step S110, trajectory information of the trained trajectory 18 is determined based on the environment information determined in step S100. The trajectory information is suitable for parking the current vehicle 40 at end position 16 of the trajectory 18. Accordingly, information about the training vehicle 12, namely information about the dimensions of the training vehicle 12 including its length, width, etc. the vehicle type of the training vehicle 12, and/or other information related to the training vehicle 12 is determined, e.g. a turning circle diameter, a driver assistance system type, type and number of environment sensors, sensor positions of the environment sensors, and others. In addition, the trajectory information of the trained trajectory 18 comprise information about the trajectory 18 describing the path of the vehicle 12 during the training along the intermediate reference points 28. The trajectory information also comprises a location of the trajectory 18. Furthermore, landmark information about the environment objects 30 in the surrounding area 32 of the trained trajectory 18 is determined. The trajectory 18 is sufficiently described by the intermediate reference points 28.

According to step S120, the method comprises an additional step of providing a personal storage 34 in a mobile device 36 of the driver. The mobile device 36 is a mobile phone in this embodiment. In this embodiment, the personal storage 34 is physically provided as part of a memory of the mobile device 36. In an alternative embodiment, the personal storage 34 is physically provided as a memory extension of the mobile device 36. Step S120 can be performed independently at essentially any time.

In step S130, the trajectory information from the training vehicle 12 is stored in the personal storage 34 associated to a driver. Hence, the trajectory information is stored in the mobile device 36.

Accordingly, a wireless data connection is established from the training vehicle 12 to the personal storage 34. The wireless data connection is a short range data connection according to a short range communication standard like WIFI, Bluetooth, or others.

Furthermore, access information for accessing the personal storage 34 is provided via the wireless data connection from the training vehicle 12 to the mobile device 36. Subsequently, as indicated by arrow 38, data transmission of the trajectory information takes place from the training vehicle 12 to the personal storage 34, as can be seen with respect to FIG. 2.

In step S140, a storage unit in a current vehicle 40 is deleted. The storage unit is provided for storing recent trajectory information in the current vehicle 40.

Step S150 refers to transferring the trajectory information from the personal storage 34 to a current vehicle 40. As indicated in FIG. 2, also the training vehicle 12 can be used later on as current vehicle 40.

Accordingly, a wireless data connection is established from the current vehicle 40 to the personal storage 34. The wireless data connection is a short range data connection according to a short range communication standard like WIFI, Bluetooth, or others. However, establishment of the short range data connection from the current vehicle 40 to the personal storage 34 is completely independent from the establishment of the short range data connection from the training vehicle 12 to the personal storage 34 and can be performed differently.

Furthermore, access information for accessing the personal storage 34 is provided via the wireless data connection from the current vehicle 40 to the mobile device 36. Subsequently, as indicated by arrow 42, data transmission of the trajectory information takes place from the personal storage 34 to the current vehicle 40, as can be seen with respect to FIG. 2, and as discussed in more detail below.

When the connection from the current vehicle 40 to the mobile device 36 is established and the personal storage 34 can be accessed, the current vehicle 40 selects one out of multiple trajectories 18 stored in the personal storage 34. The selection is made by determining a current location information of the current vehicle 40 and selecting the trajectory 18 based on the current location information compared to the location of the respective trajectory 18. The closest trajectory 18 is selected. Subsequently, the trajectory information of the selected trajectory 18 is transferred from the personal storage 34 to the current vehicle 40 and stored in the storage unit of the current vehicle 40.

In step S150, the current vehicle 40 is parked along the trained trajectory 18. Parking the current vehicle 40 along the trained trajectory 18 is done semi-autonomously by the current vehicle 40. Hence, the current vehicle 40 performs a parking maneuver along the trained trajectory 18 using its environment sensors, e.g. any of the above-mentioned ultrasonic sensors, lidar-based sensors, radar-based sensors, cameras, or others, as discussed in respect to the training vehicle 12.

The current vehicle 40 compares sensed environment information to the previously stored trajectory information to work out its position relative to the trajectory 18, which is then used to make decisions on how to maneuver the current vehicle 40 until it eventually parks at the end position 16 of the trajectory 18 defining its stored park slot location. Hence, the environment sensors are first used to detect a way to the stored park slot location in accordance with the trajectory information, and second, the current vehicle 40 uses the environment sensors in order to keep track on obstacles added to the environment compared to a time the trajectory 18 was trained and to identify moving objects.

REFERENCE SIGNS LIST 10 training scene
12 training vehicle
14 starting position
16 end position
18 trajectory
20 front detection region
22 rear detection region
24 reference starting point
26 reference end point
28 intermediate reference point
30 environment object, tree
32 surrounding area
34 personal storage
36 mobile device, mobile phone
38 arrow, data transmission from training vehicle to personal storage
40 current vehicle
42 arrow, data transmission from personal storage to training vehicle

The invention claimed is:

1. A method for autonomously parking a current vehicle along a trained trajectory, comprising:
   driving a training vehicle along the trajectory and determining environment information along the trajectory,
   determining trajectory information based on the environment information for parking the current vehicle along the trajectory, wherein the trajectory information, obtained a single time using the training vehicle operated by a driver, is specific to the driver and valid for parking any vehicle of the driver,
   storing the trajectory information from the training vehicle in a personal storage associated to a driver, transferring the trajectory information from the personal storage to the current vehicle, and parking the current vehicle along the trained trajectory.

2. The method according to claim 1, further comprising:

providing the personal storage in an access device for accessing the vehicle;

storing the trajectory information from the training vehicle in a personal storage associated to a driver comprises storing the trajectory information in the access device; and transferring the trajectory information from the personal storage to the current vehicle comprises transferring the trajectory information from the access device to the current vehicle.

3. The method according to claim 1, further comprising:

providing the personal storage in a mobile device of a driver;

storing the trajectory information from the training vehicle in a personal storage associated to a driver comprises storing the trajectory information in the mobile device; and transferring the trajectory information from the personal storage to the current vehicle comprises transferring the trajectory information from the mobile device to the current vehicle.

4. The method according to claim 1 claim, further comprising:

providing the personal storage in a network storage service associated to the driver, storing the trajectory information from the training vehicle in a personal storage associated to a driver comprises storing the trajectory information in the network storage service; and transferring the trajectory information from the personal storage to the current vehicle comprises transferring the trajectory information from the network storage service to the current vehicle.

5. The method according to claim 1, wherein each of storing the trajectory information from the training vehicle in a personal storage associated to a driver, and transferring the trajectory information from the personal storage to the current vehicle comprises providing access information for accessing the personal storage.

6. The method according to claim 1, wherein each of storing the trajectory information from the training vehicle in a personal storage associated to a driver, and transferring the trajectory information from the personal storage to the current vehicle comprises establishing a wireless data connection from the training vehicle or the current vehicle, respectively, to the personal storage.

7. The method according to claim 1, further comprising: providing a storage unit in the current vehicle; and storing the trajectory information transferred from the personal storage in the storage unit of the current vehicle.

8. The method according to claim 7, further comprising: deleting the storage unit prior to or during transfer of the trajectory information from the personal storage to the current vehicle.

9. The method according to claim 1, wherein both transferring the trajectory information from the personal storage to the current vehicle and parking the current vehicle along the trained trajectory are performed in parallel.

10. The method according to claim 1, further comprising: storing user settings of the training vehicle in the personal storage; and transferring the user settings from the personal storage to the current vehicle.

11. The method according to claim 1, wherein transferring the trajectory information from the personal storage to the current vehicle comprises selecting one out of multiple trajectories stored in the personal storage, and transferring the trajectory information of the selected trajectory to the current vehicle.

12. The method according to claim 11, wherein the step of storing the trajectory information from the training vehicle in a personal storage associated to a driver comprises storing a location of the trajectory in the personal storage, and selecting one out of multiple trajectories stored in the personal storage comprises selecting the trajectory based on current location information.

* * * * *